United States Patent [19]
Snoke et al.

[11] Patent Number: 5,645,332
[45] Date of Patent: Jul. 8, 1997

[54] EASY TO ASSEMBLE STORAGE UNIT

[75] Inventors: Steven R. Snoke, Batavia; Gary Silvis; Thomas E. Howland, both of Georgetown, all of Ohio

[73] Assignee: Stanley Mechanics Tools, Georgetown, Ohio

[21] Appl. No.: 391,211

[22] Filed: Feb. 21, 1995

[51] Int. Cl.$^6$ .................................................. A47B 43/00
[52] U.S. Cl. .................. 312/257.1; 312/263; 312/265.5; 312/249.11; 312/902; 220/690
[58] Field of Search .......................... 312/257.1, 249.8, 312/249.11, 263, 265.5, 111, 902, 140; 220/4.28, 690

[56] References Cited

U.S. PATENT DOCUMENTS

| | | |
|---|---|---|
| 1,557,066 | 10/1925 | Krantz . |
| 1,646,492 | 10/1927 | Rauchback .......................... 312/199 X |
| 2,065,282 | 12/1936 | Krueger ................................ 220/690 X |
| 2,093,199 | 9/1937 | Laxo ........................................ 220/690 |
| 2,147,775 | 2/1939 | Miller et al. ............................. 138/167 |
| 2,201,409 | 5/1940 | Siebenlist .................................. 138/166 |
| 2,259,382 | 10/1941 | Ingels ....................................... 403/326 |
| 2,740,258 | 4/1956 | Weber ....................................... 60/547.1 |
| 2,916,181 | 12/1959 | Pfister et al. .......................... 220/690 X |
| 3,216,426 | 11/1965 | Fürrer ..................................... 211/184 |
| 3,672,531 | 6/1972 | Balven ..................................... 220/4.28 |
| 3,831,799 | 8/1974 | Nutt ......................................... 220/4.31 |
| 3,856,374 | 12/1974 | Chrisken .................................... 312/263 |
| 4,120,551 | 10/1978 | Godtschalck .......................... 312/348.1 |
| 4,463,997 | 8/1984 | Densen ................................ 312/265.5 X |
| 4,479,737 | 10/1984 | Bergh et al. ............................. 403/382 |
| 4,482,074 | 11/1984 | Lalley ................................. 312/265.5 X |
| 4,940,155 | 7/1990 | Hewson ......................................... 220/6 |
| 5,109,985 | 5/1992 | Rose ........................................ 206/600 |
| 5,246,289 | 9/1993 | Huebschen et al. ..................... 312/263 |
| 5,294,196 | 3/1994 | Chen ................................. 312/249.11 X |
| 5,372,269 | 12/1994 | Sutton et al. ........................ 220/690 X |

FOREIGN PATENT DOCUMENTS

| 1149149 | 5/1963 | Germany ............................ 312/257.1 |

OTHER PUBLICATIONS

Craftsman "Power & Hand Tools" Catalog 1994.

*Primary Examiner*—Peter M. Cuomo
*Assistant Examiner*—James O. Hansen
*Attorney, Agent, or Firm*—Standley & Gilcrest

[57] ABSTRACT

An easy to assemble storage unit is disclosed. It provides a method of assembly that utilizes an interlocking scheme of tabs, catches and openings. The connection comprises a catch within a tab extending from a wall of the container that locks into a receiving opening on a top wall or floor panel. The storage unit utilizes similar components for the side walls and similar components for the top wall and floor panel.

7 Claims, 8 Drawing Sheets

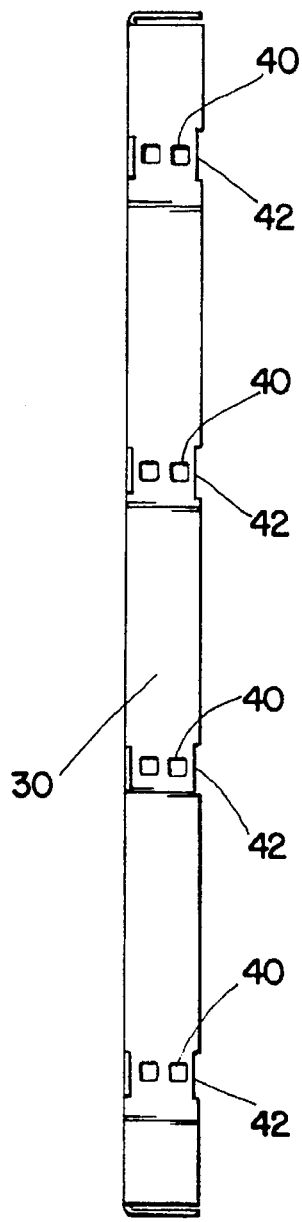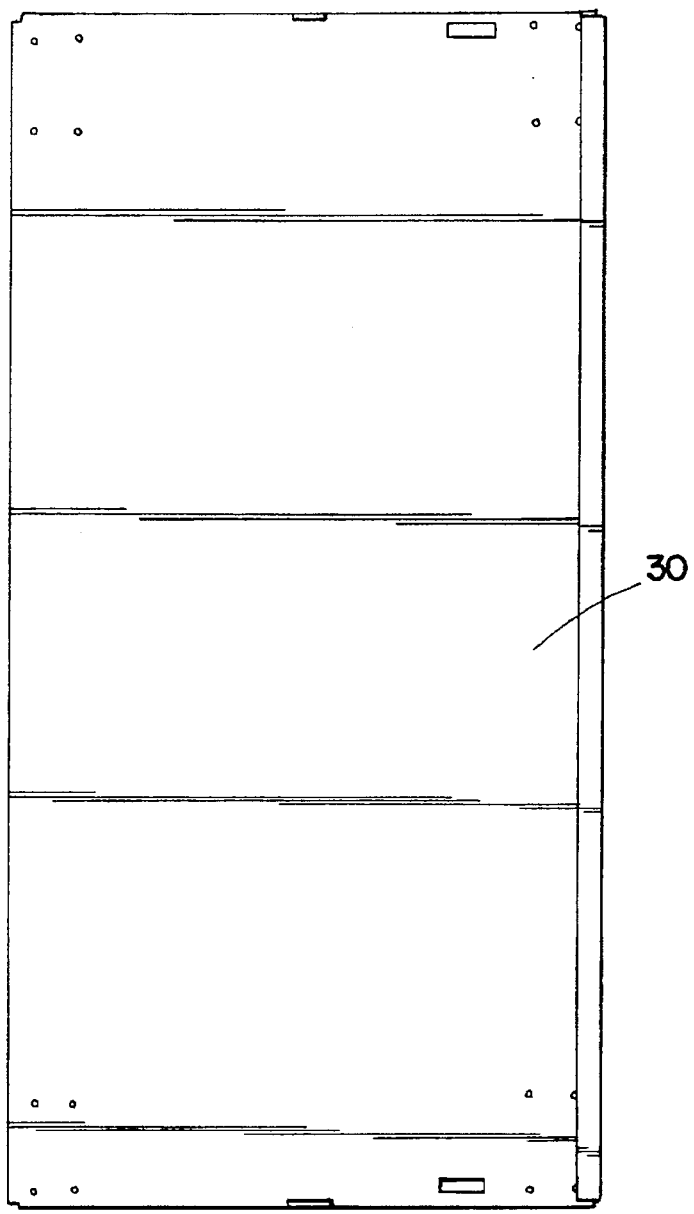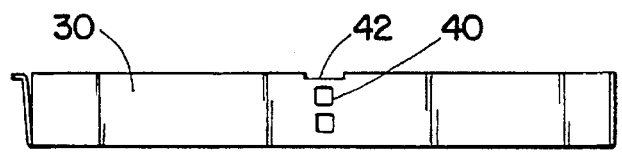
Fig. 3
Fig. 4
Fig. 5

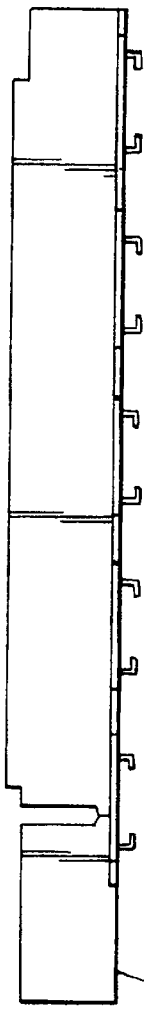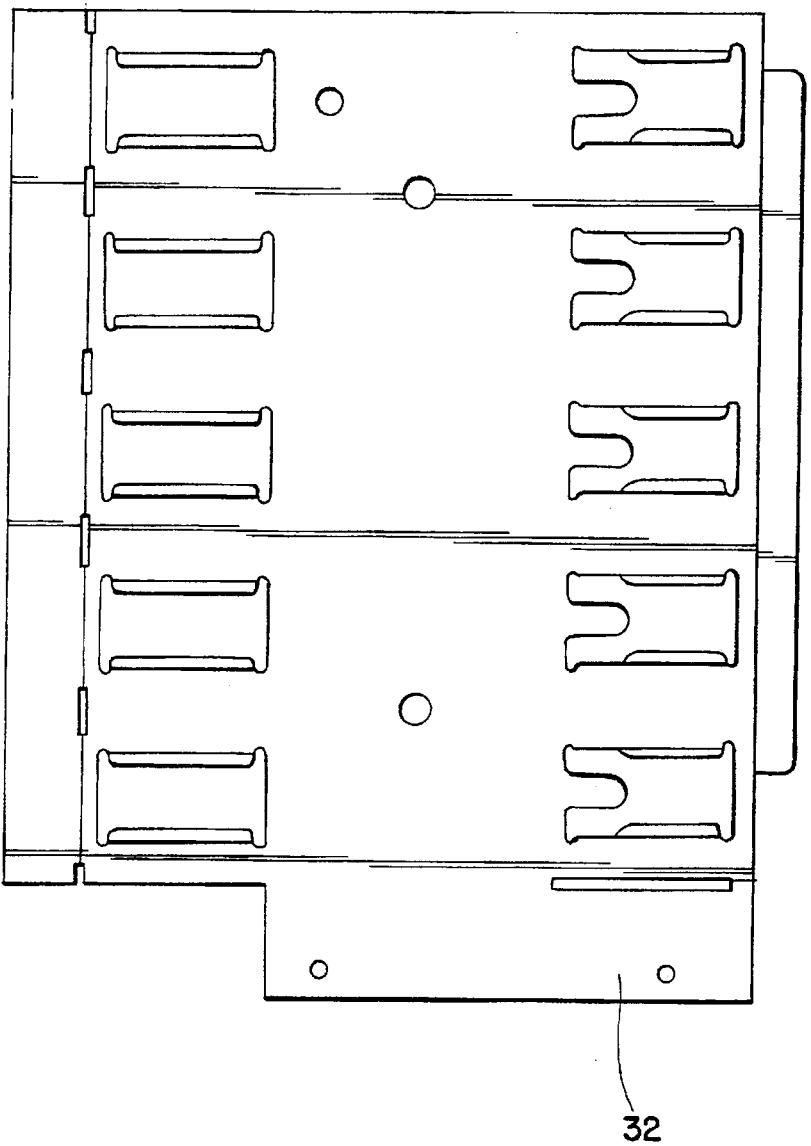
Fig. 9
Fig. 10

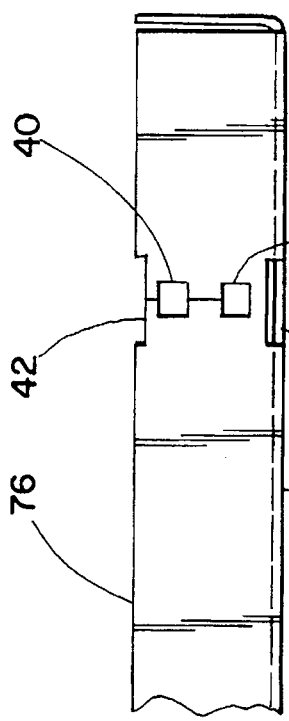
Fig. 17
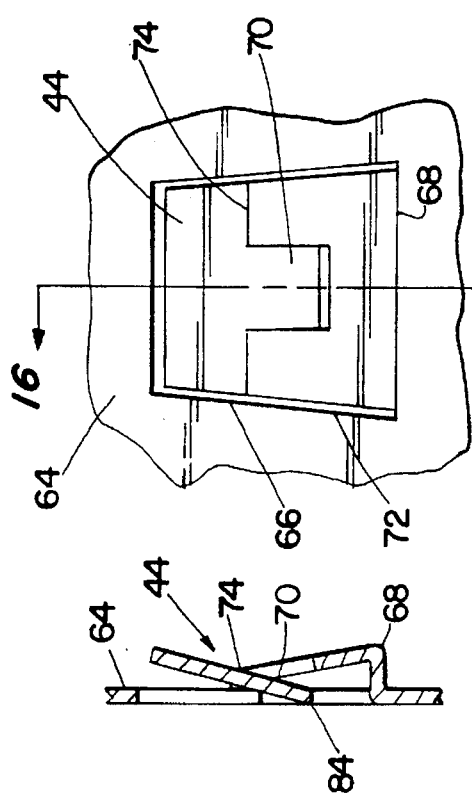
Fig. 15
Fig. 16
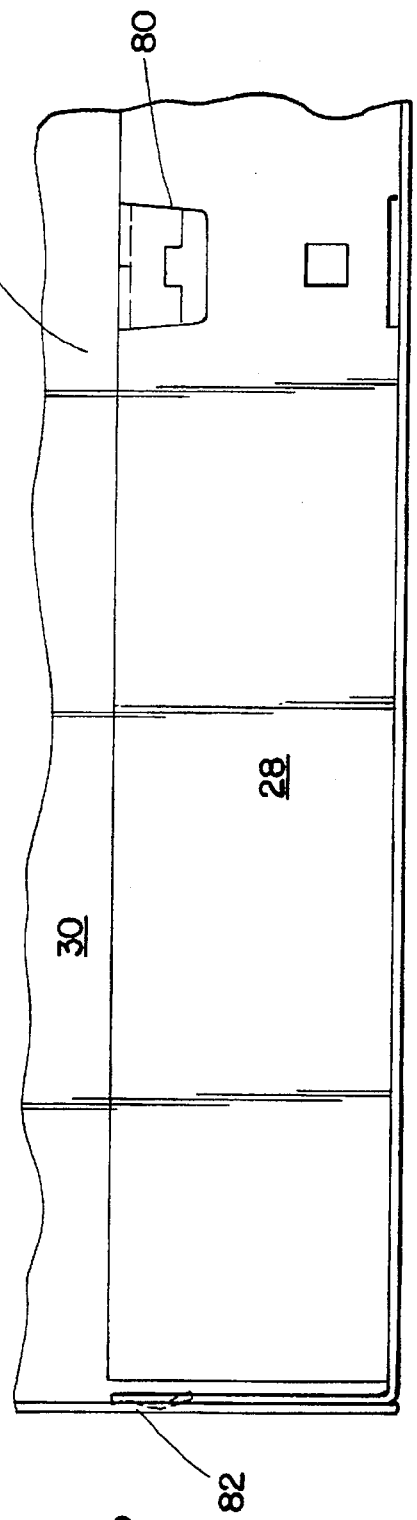
Fig. 18

EASY TO ASSEMBLE STORAGE UNIT

BACKGROUND AND SUMMARY OF THE INVENTION

The present invention relates generally to the art of storage units and more particularly to an easy to assemble tool storage unit which is also inexpensive for a producer to bring to the marketplace.

Mechanics, do-it-yourselfers and others require storage for tools. There are a wide variety of tool storage units or toolboxes available on the market for these people. The storage containers that come pre-assembled from the manufacturer have increased shipping costs and therefore exhibit higher prices. Shipping costs may vary according to weight or according to the dimensions of the packaging. Generally, comparable storage containers exhibit comparable shipping weight. However, some storage containers for these units exhibit widely varying packaging dimensions.

The present invention overcomes the problem of high shipping costs by providing an easy to assemble storage unit that exhibits significantly reduced shipping dimensions. The present invention utilizes components that nest compactly and easily in packaging for later shipment. Preferably substantially identical wall components are used to provide right and left side walls and a rear wall. Preferably substantially identical top and bottom wall components are used to provide top and bottom walls. The use of such standardized components also assists in minimizing manufacturing costs.

In the past, storage containers that were designed for home owner needs required at least some minimal use of assembly tools for fasteners such as rivets, bolts and nuts, or screws. These fasteners sometimes required cataloging and indexing to assure their correct placement within the finished assembly and to avoid losing or misplacing the fasteners prior to assembly. Additionally, complicated instructions were required to assist in the correct assembly of the storage containers. In the end, even the most dedicated and skillful do-it-yourselfers found their efforts to assemble the container often frustrated by such complicated matters.

The present invention overcomes the problems of such complicated instructions and use of fasteners by providing a method of assembly that substantially minimizes the requirement for such fasteners. The present invention provides a method of assembly that utilizes an interlocking scheme of integral tabs, catches and openings. Briefly, the method of connection comprises a catch within a tab extending from a wall of the container that locks into a receiving opening on a top or bottom wall. The receiving opening is generally located adjacent an edge of a side wall of the top or bottom wall. The edge may include a bend on the top or bottom wall. This edge slides between the tab and the wall from which the tab extends. The catch extending from the tab snaps into the receiving opening of the second component and locks it into position. This method of connection provides a degree of security not found in prior storage containers while still allowing for easy disassembly.

It is to be appreciated that the present invention is not limited to use only for tool storage boxes. The present invention may be used in countless storage means where a simple means of assembly is desired.

Other principal features and advantages of the invention will become apparent to those skilled in the art upon review of the following detailed description, claims and drawings.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a lengthwise elevation view of a top or bottom component of a storage unit of the present invention;

FIG. 4 is a plan view of the component of FIG. 3;

FIG. 5 is a depthwise elevation view of the component of FIG. 3;

FIG. 9 is a front elevation view of an inner panel of a storage unit of the present invention;

FIG. 10 is a right side elevation view of the panel of FIG. 9;

FIG. 15 is a cutaway view of a portion of the side component of FIG. 6 showing a connector of the present invention;

FIG. 16 is a sectional view taken along line 16—16 of FIG. 15;

FIG. 17 is a cutaway view of a portion of the top or bottom component of FIG. 3; and FIG. 18 is a cutaway view of the connection between the wall component of FIG. 6 and the top or bottom component of FIG. 3.

DESCRIPTION OF THE PREFERRED EMBODIMENT(S)

Figure 1:
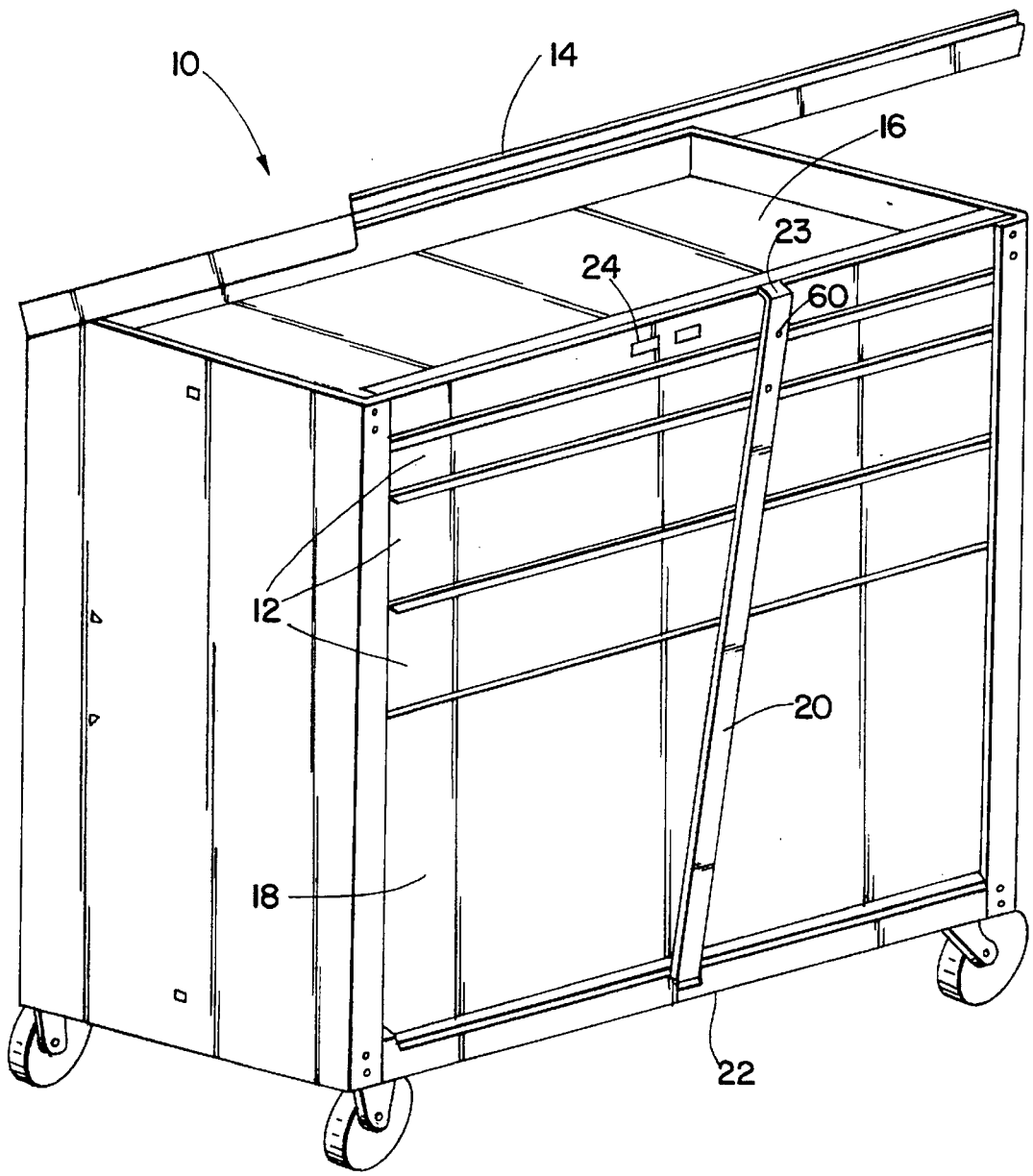
FIG. 1 is a perspective view of an assembled storage unit of the present invention.

Referring to FIG. 1, a perspective view of the storage container of the present invention is shown at 10. Preferably, the storage unit 10 has three drawers 12 but it is to be appreciated that the storage unit may have more or less drawers as desired. A lid 14 may be used to provide a compartment on the top of the storage unit at 16. The storage unit preferably has a drop door 18 which secures a storage compartment behind the drop door. A lock bar 20 may be adapted to attach to the storage unit at 22 and may be locked at 24 through, for example, available means 25 with a hasp lock (not shown). The door lock bar 20 prevents unauthorized entry into the storage unit through the drop door 18, the drawers 12 and the lid 14. In a preferred embodiment, a portion 23 of the bar 20 would reside over the top of the lid 14 to prevent opening of the lid while the bar is in place.

Figure 2:
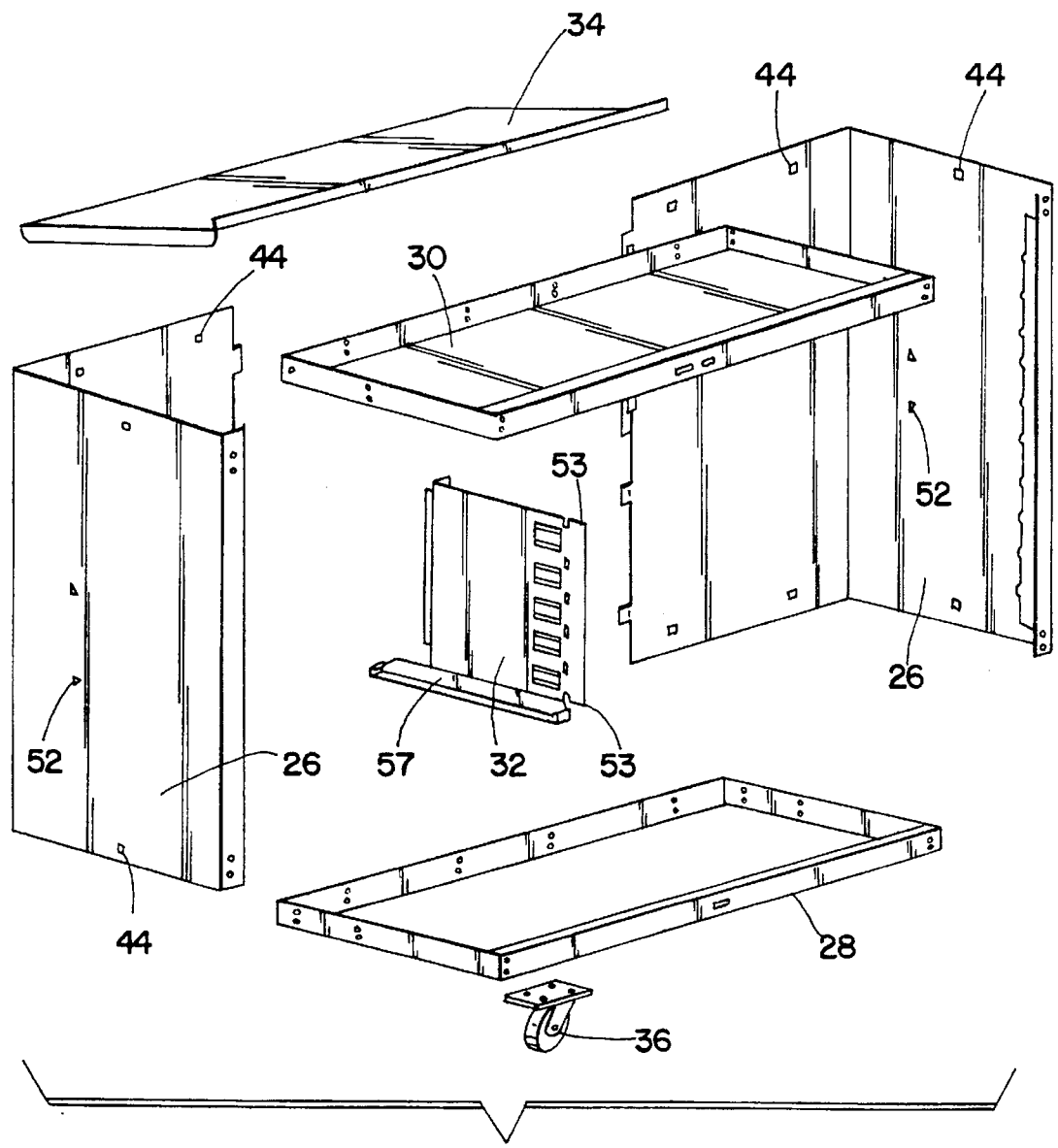
FIG. 2 is an exploded perspective view of a storage unit of the present invention.

FIG. 2 is an exploded view of the storage unit 10 of FIG. 1 with the drawers 12 and the drop door 18, inter alia, removed from view. The storage unit 10 preferably has substantially identical wall components 26 that comprise the side and rear walls to the storage unit. A floor panel 28 and a top wall 30 are shown. A single inner panel 32 (multiple inner panels may be needed in a given embodiment), lid 34 and a caster 36 (one of four total, each preferably secured by conventional fasteners to corners of said floor panel 28) are also shown.

Figure 6:
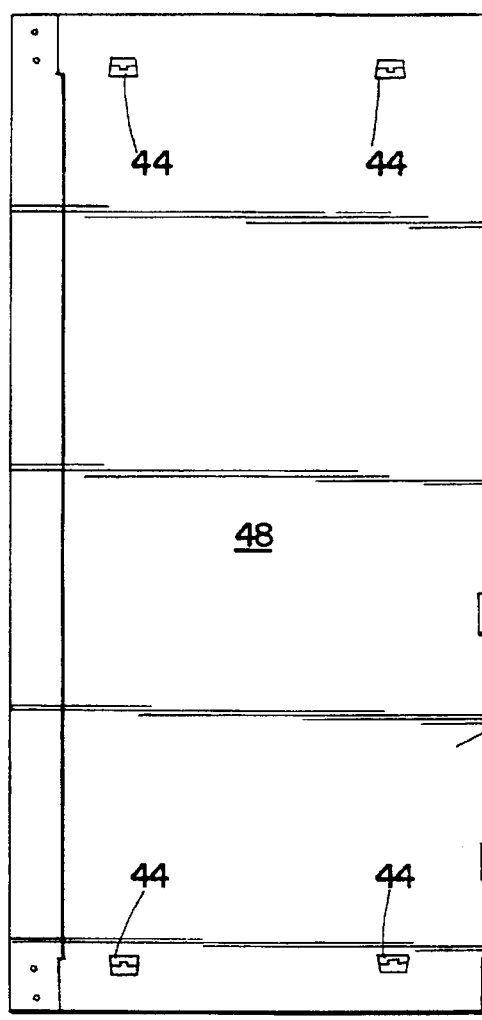
FIG. 6 is a front elevation view of a wall component of a storage unit of the present invention.
Figure 7:
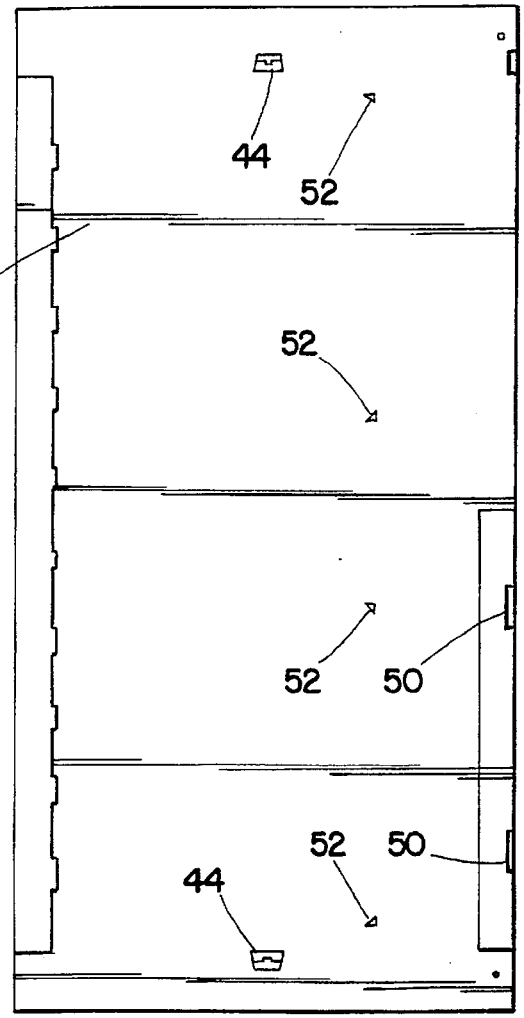
FIG. 7 is a right side view of the component of FIG. 6.
Figure 8:
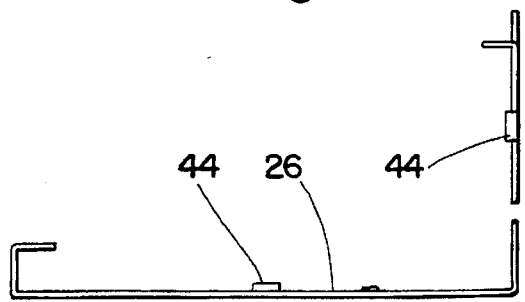
FIG. 8 is a plan view of the component of FIG. 6.

Referring now to FIGS. 3, 4 and 5, component 30 that can serve as both a top wall or a floor panel is shown. FIGS. 3 and 5 show receiving openings 40 and corresponding notches 42 that allow connection to the wall components 26 of the storage unit. FIGS. 6, 7 and 8 show a wall component 26. The wall component 26 has integral tabs 44 that interlock in the corresponding receiving openings 40 and notches 42 of FIGS. 3 and 5. FIG. 6 shows tabs 46 on the rear wall portion 48 that interlock into slots 50 of FIG. 7. Lastly, FIG. 7 shows corner pockets 52 that receive the corners 53 of inner panels 32 (FIG. 2).

Figure 11:
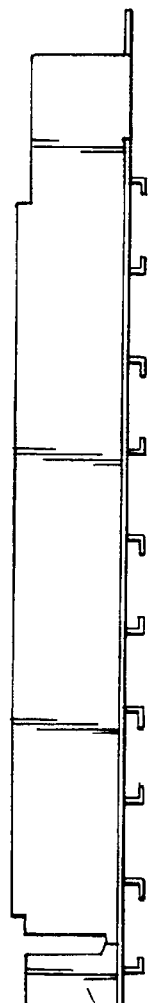
FIG. 11 is a front elevation view of another inner panel of a storage unit of the present invention.
Figure 12:
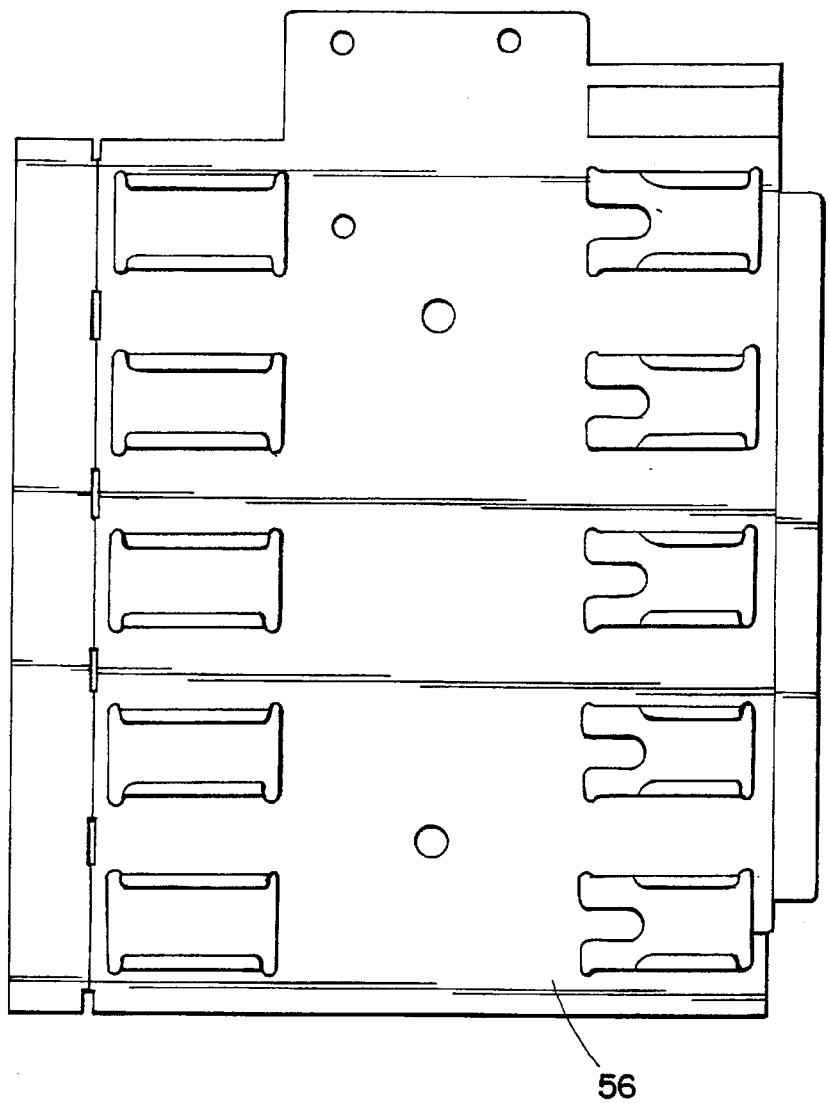
FIG. 12 is a left side elevation view of the panel of FIG. 11.

FIGS. 9 and 10 show a left side inner panel 32 and FIGS. 11 and 12 show a fight side inner panel 56. Inner panels 32 and 56 connect to respective fight and left side walls of the storage unit 10 by corner pockets 52 of the wall component 26. The inner panels are adapted to slidably support drawers 12 within the storage unit 10. Additionally, the inner panels may have a drop door support 57 (shown in FIG. 2) attached to hingedly support a drop door 18.

Figure 13:
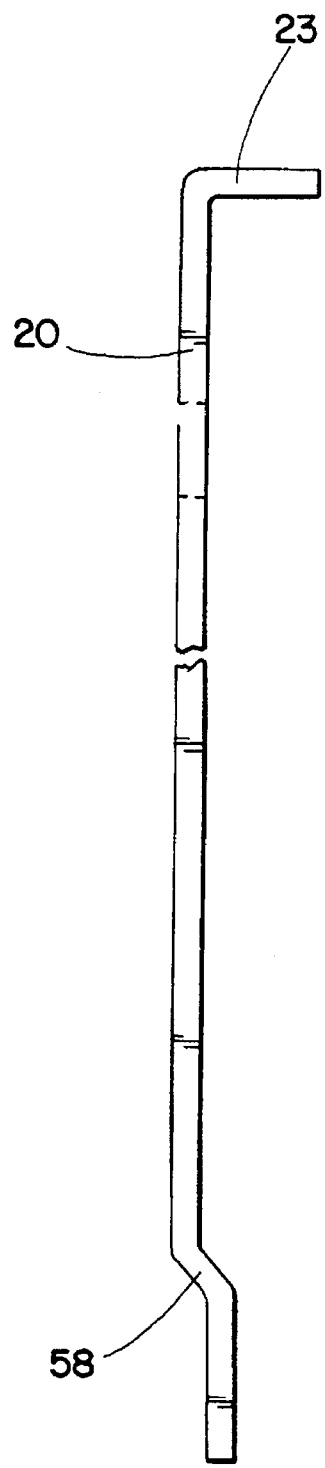
FIG. 13 is a left side elevation view of a lock bar of a storage unit of the present invention.
Figure 14:
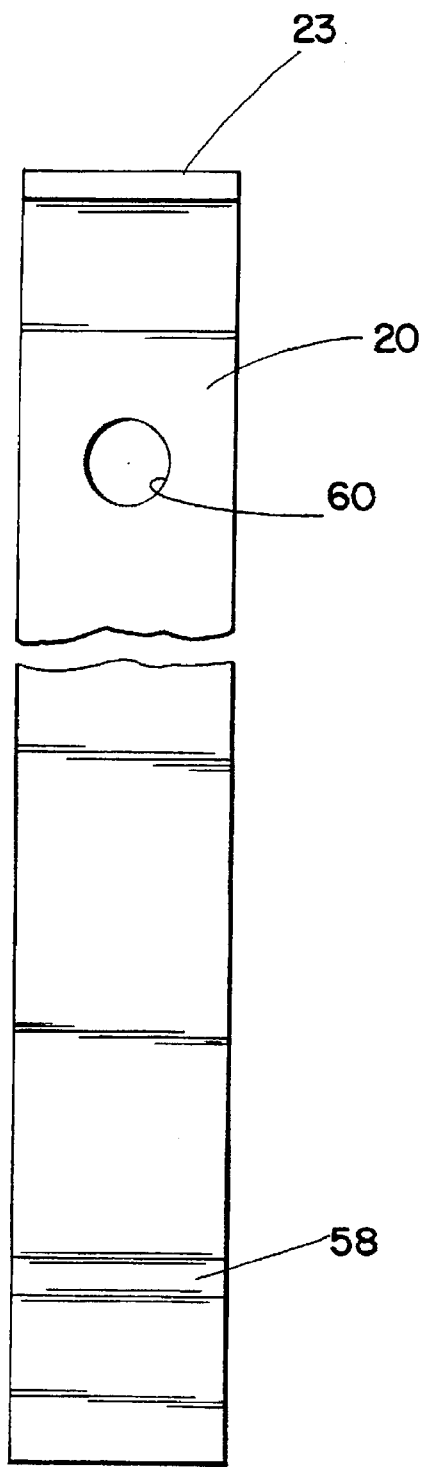
FIG. 14 front elevation view of the lock bar of FIG. 13.

FIGS. 13 and 14 show a lock bar 20. The lock bar 20 is preferably configured with a bend 58 to be received into a portion of the floor panel at 22. The resulting connection may be viewed in FIG. 1 at 22. The upper portion of lock bar 20 has an opening 60 that is adapted to receive, for example, a lock hasp. Additionally, the top of lock bar 20 is designed to cover a portion of lid 14 at 23.

FIGS. 15 and 16 show sectional and broken away views of an integral tab 44 in one of said walls. Tab 44 may be formed from the surrounding wall component material 64 by cutting an outer edge 66. The tab 44 may be formed from the wall component 26 and may be integral to that component along an edge 68. Alternatively, it is to be understood that tab 44 may be formed from a portion of either or both the top wall 30 and floor panel 28. The tab 44 may be substantially parallel to the surface of the wall component 26 and may be offset therefrom, preferably just a fraction of an inch offset. A catch 70 may be formed from tab 44 by cutting along an edge 72 within the tab. The tab 44 may be bent along line 74, which may be along the integral edge of the catch 70 with the tab 44, to extend the distal end of the catch 70.

FIG. 17 is a front view of a receiving opening 40 and notch 42 on a top wall 30 or a floor panel 28. Receiving opening 40 is adapted to receive the catch 70 of the tab 44 formed in the wall component 26. Optionally, notch 42 may be formed in the top wall 30 or floor panel 28 to accommodate a portion of the integral edge 68. The material of the top wall 30 or floor panel 28 that is between the notch 42 and the receiving opening 40 serves as a catch lock for catch 70. FIG. 17 illustrates that top wall 30 or floor panel 28 preferably have a pair of oppositely disposed receiving openings 40 and notches 42. The first set is along edge 76 and the second set is along bend 78.

FIG. 18 shows a completed connection between wall component 26 and floor panel 28. The wall component 26 is located behind the floor panel 28 and is connected at 80 and 82 to the floor panel. The connection is made by aligning the edge adjacent the receiving opening of the floor panel with the tab of the wall component. The floor panel catch lock is then pressed between the tab 44 and past the catch 70 until the catch 70 snaps into the receiving opening 40. The tab 44 may be constructed of resilient material that allows the catch to be pressed toward the tab as the floor panel slides against the catch. Once the catch 70 is positioned within the receiving opening 40 a blunt end of the catch prevents the catch from leaving the receiving opening. Additionally, if the catch is of a resilient material it may be biased into the receiving opening, thus preventing the blunt end of the catch from leaving the receiving opening.

The connection may be disconnected by pressing the catch out of the receiving opening until the blunt end of the catch 84 (see FIG. 16) clears the receiving opening. The floor panel may then be pulled apart from the wall component. Pressure against the catch may then be released.

The scope of the invention is not to be considered limited by the above disclosure, and modifications are possible without departing from the spirit of the invention as evidenced by the following claims.

What is claimed is:

1. A storage container, comprising:

a pair of oppositely disposed wall members substantially identical in shape to each other, wherein each of said wall members has a side wall portion and a rear wall portion, wherein said rear wall portions are connected to form a rear wall;

at least one upper tab integral with at least one of said wall members wherein said upper tab is offset from a surface of said wall member, said upper tab having a proximal edge and a distal end;

an upper catch integral with said upper tab along a proximal edge of said upper catch, said proximal edge of said upper catch located at a point intermediate between said proximal edge of said upper tab and said distal end of said upper tab, said upper catch extending from said proximal edge of said upper catch to a distal end of said upper catch, said distal end of said upper catch located between said proximal edge of said upper catch and said proximal edge of said upper tab, said upper catch being bent along said proximal edge of said upper catch, such that said distal end of said upper catch is biased towards said surface of said wall member;

at least one lower tab integral with at least one of said wall members, wherein said lower tab is offset from a surface of said wall member said lower tab having a proximal edge and a distal end;

a lower catch integral with said lower tab along a proximal edge of said lower catch, said proximal edge of said lower catch located at a point intermediate between said proximal edge of said lower tab and said distal end of said lower tab, said lower catch extending from said proximal edge of said lower catch to a distal end of said lower catch, said distal end of said lower catch located between said proximal edge of said lower catch and said proximal edge of said lower tab, said lower catch being bent along said proximal edge of said lower catch, such that said distal end of said lower catch is biased towards said surface of said wall member;

a floor panel having side portions connected to said wall members;

at least one opening formed in a surface of one of said floor panel side portions, wherein said opening receives said distal end of said lower catch;

a top wall having side portions connected to said wall members; and at least one opening formed in a surface of one of said top wall side portions, wherein said opening receives said distal end of said upper catch.

2. The storage container of claim 1, further comprising:

a lid hinged to said pair of wall members said lid covering said top wall.

3. The storage container of claim 1, further comprising:

at least three casters attached to said floor panel.

4. The storage container of claim 1, further comprising:

a first inner panel attached to one of said pair of wall members;

a second inner panel attached to the other of said pair of wall members; and at least one drawer connected to said first and second inner panels in a sliding relationship.

5. The storage container of claim 1, further comprising:

a lock bar adapted to engage a front portion of said floor panel, wherein said lock bar extends at least from said floor panel to said top wall, said lock bar adapted to receive a lock and said top wall having an opening adapted to receive said lock, to thereby secure the storage container.

6. The storage container of claim 1, further comprising:

a drop door in a hinged relationship with said first and second inner panels.

7. A storage container, comprising:

a pair of oppositely disposed wall members substantially identical in shape to each other, wherein each of said wall members has a side wall portion and a rear wall portion, wherein said rear wall portions are connected by intertwining tabs and slots to form a rear wall;

at least one upper tab on each of said wall members said upper tab having a proximal edge and a distal end, wherein each upper tab is integral to said wall member along said proximal edge of said upper tab, and wherein each upper tab is offset from a surface of said wall member;

an upper catch integral with said upper tab along a proximal edge of said upper catch, said proximal edge of said upper catch located at a point intermediate between said proximal edge of said upper tab and said distal end of said upper tab, said upper catch extending from said proximal edge of said upper catch to a distal end of said upper catch, said distal end of said upper catch located between said proximal edge of said upper catch and said proximal edge of said upper tab, said upper catch being bent along said proximal edge of said upper catch, such that said distal end of said upper catch is biased towards said surface;

at least one lower tab on each said wall member having a proximal edge and a distal end, wherein each said lower tab is integral to said wall member along said proximal edge of said lower tab, wherein said lower tab is offset from a surface of said wall member;

a lower catch integral with said lower tab along a proximal edge of said lower catch, said proximal edge of said lower catch located at a point intermediate between said proximal edge of said lower tab and said distal end of said lower tab, said lower catch extending from said proximal edge of said lower catch to a distal end of said lower catch, said distal end of said lower catch located between said proximal edge of said lower catch and said proximal edge of said lower tab, said lower catch being bent along said proximal edge of said lower catch, such that said distal end of said lower catch is biased towards said surface;

a floor panel having side portions, a front portion and a rear portion, wherein at least one of said side and rear portions have at least one opening adapted to receive said distal end of said lower catch;

a top wall substantially identical to said floor panel, said top wall having side portions, a front portion and a rear portion, wherein said top wall side and rear portions have at least one opening adapted to receive said distal end of said upper catch;

a lid hinged to said pair of wall members said lid covering said top wall;

roller means secured to said floor panel;

a first inner panel attached to one of said wall members;

a second inner panel attached to the other of said wall members;

at least one drawer connected to said first and second inner panels in a sliding relationship;

a drop door in a hinged relationship with said first and second inner panels; and a lock bar adapted to engage said floor panel and said top wall.

* * * * *

UNITED STATES PATENT AND TRADEMARK OFFICE
CERTIFICATE OF CORRECTION

PATENT NO. : 5,645,332
DATED : July 8, 1997
INVENTOR(S) : Steven R. Snoke, et. al.

It is certified that error appears in the above-indentified patent and that said Letters Patent is hereby corrected as shown below:

In column 3, line 13, please delete the word "fight" and replace it with "right".

In column 3, line 14, please delete the word "fight" and replace it with "right".

Signed and Sealed this

Eighteenth Day of November 1997

Attest:

BRUCE LEHMAN

Attesting Officer

Commissioner of Patents and Trademarks